United States Patent [19]
Hapke et al.

[11] 3,811,612
[45] May 21, 1974

[54] FILM SNUBBER CONTROL SYSTEM

[75] Inventors: Kenyon A. Hapke, Libertyville; John P. Bagby, Lake Forest, both of Ill.

[73] Assignee: Bell & Howell Company, Chicago, Ill.

[22] Filed: June 28, 1973

[21] Appl. No.: 374,281

[52] U.S. Cl. ................. 226/195, 226/60, 242/198, 352/78
[51] Int. Cl. .......................................... B65h 23/08
[58] Field of Search .......... 226/38, 195, 39, 59, 60, 226/195; 242/198; 352/72, 78, 130

[56] References Cited
UNITED STATES PATENTS
2,099,376  11/1937  Shapiro ........................ 226/195 X
2,819,069  1/1958  Isom ........................... 226/60

*Primary Examiner*—Richard A. Schacher
*Attorney, Agent, or Firm*—James P. Hume

[57] ABSTRACT

A film snubber activating and control system for use with a film cassette having a rotatable and lockable film snubber. The system includes snubber locking means arranged to selectively lock and release said film snubber in a manner which will maintain the cassette in a selected location.

11 Claims, 7 Drawing Figures

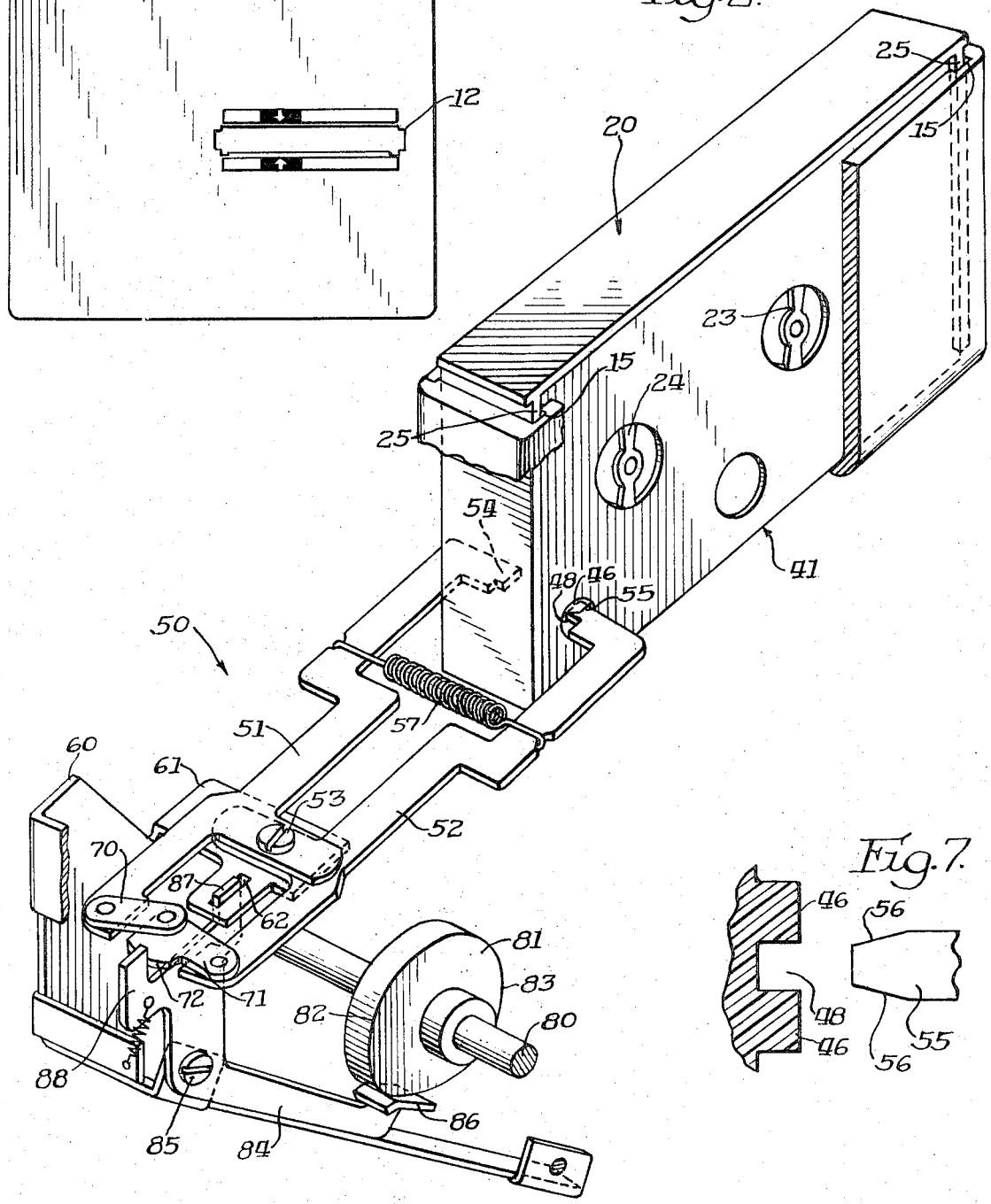

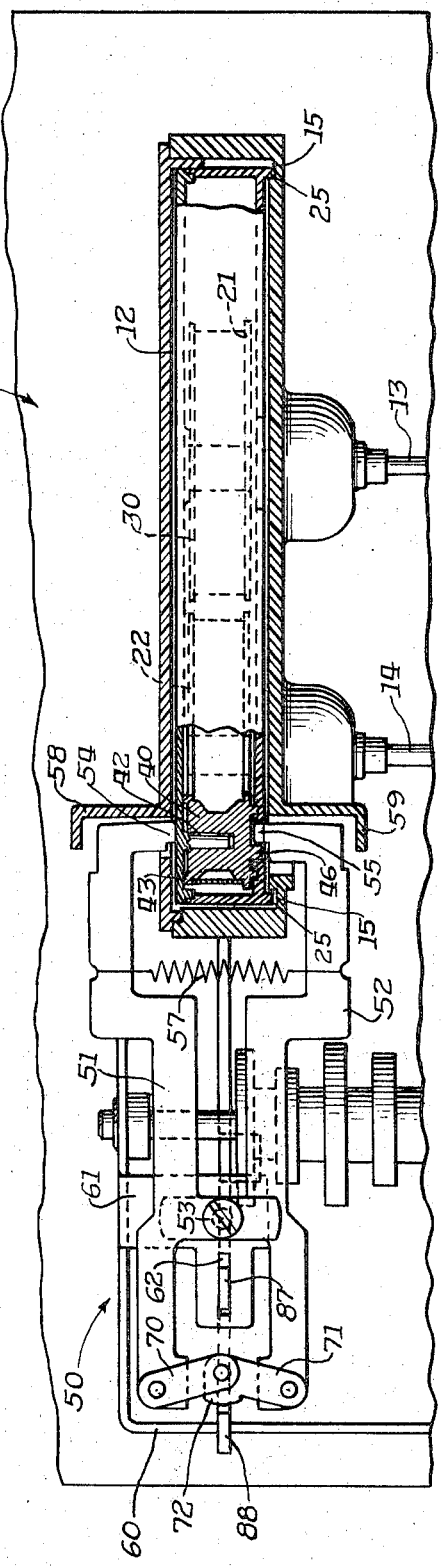
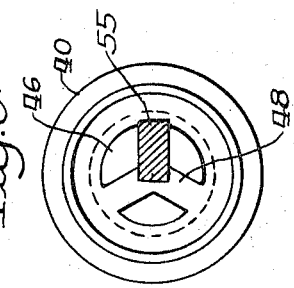
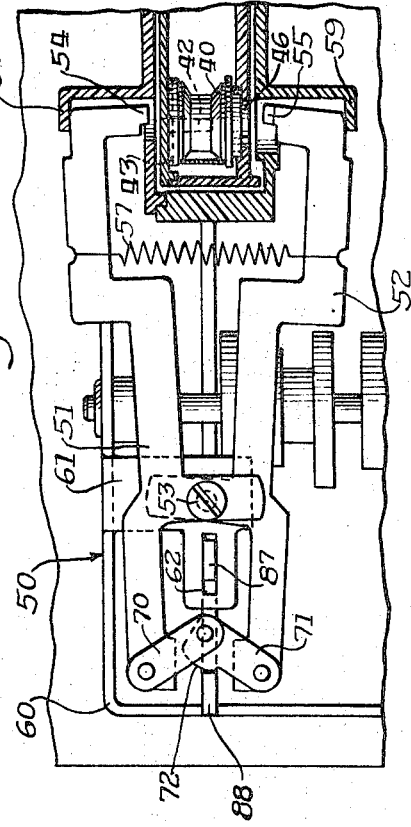

FILM SNUBBER CONTROL SYSTEM

BACKGROUND AND GENERAL DESCRIPTION OF THE INVENTION

This invention relates generally to components for an integrated system for rapidly developing and projecting a roll of film while the film is maintained with a protective cassette.

A coil or roll of film in the past has been handled in a very cumbersome and time consuming manner. The general practice has been to have a roll of exposed film developed by a processing laboratory after the roll has been exposed. The result of this practice is a delay of at least several days before the developed film can be viewed and enjoyed.

Recent technological advances in diffusion transfer techniques make it possible for film to be processed and projected soon after the film has been exposed. Furthermore, systems for accomplishing the rapid exposure, development and projection of film recently have been developed. Basically, such systems include a camera designed for exposing the film under the proper conditions; a processor which functions to develop the exposed film; and a viewer for showing the developed film. The film used in such a system is retained for safety within a protective container or cassette, so that the film will not be damaged or prematurely exposed during the operation of the system.

It has been found that one of the important features in the development of such systems and system components is the interfaces between the film-handling cassette and both the camera and the processor/viewer. The cassette must be positioned and retained in the camera and processor/viewer in a manner that assures the proper handling and orientation of the film. In addition, the interfaces with the cassette must permit the film to be driven intermittently in the forward direction by the camera and processor/viewer shuttle during the exposure and the projection of the film; driven in a substantially constant speed in a reverse direction in the processor/viewer as the exposed film is developed within the cassette; and driven at a substantially constant speed in a reverse direction by the processor/viewer during the rewinding or re-playing of the film.

A camera system having a cassette and camera interface which is compatible with an integrated system for rapidly developing and projecting a roll of motion picture film, is described and claimed in commonly assigned, copending application, Ser. No. 283,631, filed on Aug. 24, 1972, by Arthur C. Mueller.

In order to perform the above-described functions in the camera and processor/viewer, it has been found that the cassette must incorporate a rotatable and lockable snubber positioned between the film gate aperture area and the film take-up reel. The film is driven intermittently in a forward direction by a shuttle-tooth drive system in the camera and the processor/viewer during the exposure and projection of the film, respectively. At the same time, the film-take-up reel is constantly driven by a motor with a suitable clutch system, provided in both the camera and processor/viewer, to coil the exposed or projected film onto the take-up reel. Under such conditions, the snubber must be provided with a film-engaging friction surface, and must be locked from rotation. The locked snubber will thereby frictionally engage with the film in the camera during exposure, and in the processor/viewer during projection, and function as a stationary friction brake which isolates the film in the film gate area from the continuous driving torque of the take-up reel motor. The locked snubber also isolates the film in the film gate area from the impact energy of the film driving system when the film slack around the snubber goes to zero.

The principal purpose of the present invention is to provide a film processor/viewer system including an interface which permits the processor/viewer to receive a cassette of film for rapid development and projection. More specifically, the system of the present invention provides an interface which permits a film-handling cassette to be readily inserted and removed from a recess provided in the processor/viewer unit. The unit is designed to retain a cassette in a selected orientation within the slot during all of the functions of the processor/viewer. The unit further operates to lock and release the film snubber provided in the cassette in a manner which does not disorient the cassette.

To accomplish these functions, the cassette usable with this invention incorporates a rotatable and lockable film snubber spool which is engageable with the film in the cassette. The snubber is locked by the processor/viewer unit to assist the movement of the film in the cassette by the shuttle mechanism provided in the processor/viewer during the projection mode, by intermittently braking the film movement. As explained further below, the locked snubber isolates the film frames being illuminated by the projection lamp from the driving force of the film advance motor in the processor/viewer. Moreover, the cassette processor/viewer interface in accordance with this invention is arranged to release the snubber lock when the film in the cassette is developed, rewound or rapidly advanced in a reverse direction from the cassette take-up spool to the cassette supply spool. The interface with the cassette snubber provided in the processor/viewer is also arranged so that the snubber can be quickly released and locked without affecting the proper orientation of the cassette and the film in the processor/viewer unit.

Briefly described, the film snubber activating and control system in accordance with this invention is usable in cooperation with a film cassette including a rotatable and lockable film snubber. The system includes positioning means for stationing the cassette in a selected location; snubber locking means; and activating means for the locking means. The locking and activating means are arranged so that the locking means are movable between a locked position to prevent rotation of the film snubber and a released position which permits the snubber to rotate. Additionally, the locking means are further arranged to apply substantially equal and opposite forces to opposed portions of the cassette simultaneously as the locking means moves to the locked position, and to release the opposite forces simultaneously as the locking means moves to said released position. The action of said locking means thereby controls the functioning of the film snubber without disaligning the film cassette from its selected location.

EXEMPLARY EMBODIMENT

Further objects and features of the present invention will become more apparent from a description of an embodiment thereof, taken in conjunction with the accompanying drawings, in which:

FIG. 1 is a schematic plan view of the processor/viewer embodying the features and advantages of the present invention;

FIG. 2 is a perspective view of the processor/viewer components comprising an interface system which controls the positioning of the cassette within the processor/viewer, and the locking and releasing of the film snubber;

FIG. 3 is an enlarged partial plan view of the cassette interface in accordance with this invention, illustrating the system components in a position which locks the film snubber from rotation;

FIG. 4 is an enlarged partial plan view of the cassette interface illustrating the system components in a position which releases the film snubber for rotation;

FIG. 5 is an enlarged perspective view of the film snubber spool and snubber locking means incorporated in the system of the present invention;

FIG. 6 is a cross-sectional view illustrating the engagement between the spool and the snubber locking means; and FIG. 7 is a partial cross-sectional view illustrating the preferred relationship between the engageable portions of the snubber spool and snubber locking means.

A film processor/viewer unit including the cassette interface system of the present invention is generally illustrated in FIG. 1 by the reference numeral 10. The unit 10 contains components for accomplishing the developing, projection and rewind modes of operation on an exposed roll of film embodied with a film-handling cassette 20. The unit 10 is provided with a slot 12 of selected dimensions to receive and confine the cassette 20. As seen in FIGS. 1 and 3, the end portions of the slot 12 include orientation grooves 15. The grooves 15 engage with compatible orientation ribs 25 provided on the ends of the cassette 20 to guide the cassette as it is inserted into the slot 12. The grooves 15 and ribs 25 assure that the cassette 20 is oriented properly within the slot 12. A close tolerance between the edges of the slot 12 and the cassette 20 also is provided so that the cassette will remain in a selected position within the slot of the unit 10 during the various modes of operation. Additional interface systems for positioning and securing the cassette 20 with the slot 12 in a selected position are described and claimed in co-pending Application for Film Cassette Sensing and Retaining Unit, by John P. Bagby et al, filed concurrently herewith, and assigned to the same assignee.

As seen in FIGS. 2 and 3, the cassette 20 is generally rectangular in configuration, and is provided with a film supply reel 21 and a film take-up reel 22. A roll of film 30 is extended between the reels 21 and 22. Connecting means 23 and 24 are arranged on the supply and take-up reels 21 and 22, respectively. Suitable drive systems 13 and 14, as illustrated in FIG. 3, engage with the connecting means 23 and 24 to selectively drive the take-up and supply reels 21 and 22 during the operation of the unit 10. A suitable driving system for the reels 21 and 22 is described and claimed in commonly assigned, co-pending application, Ser. No. 374,283 filed June 28, 1973, for Drive Interface System, by Raymond E. Clever, Kenyon A. Hapke and Thomas R. Wells, filed concurrently herewith.

The cassette 20 adapted for use in the system of the present invention also includes a rotatable and lockable film snubber spool 40. The snubber spool 40 is positioned within the cassette between the take-up reel 22 and the cassette film gate area 41. The snubber spool 40 is adapted to be locked so that the intermittent shuttle drive incorporated in the unit 10 can advance the film 30, frame-by-frame through the film gate area 41 during the projection mode of operation. The driving force of the take-up drive system 14, which includes a slipclutch (not shown) will then coil the film 30 onto the take-up reel 22 without interfering with the stability of the film in the film gate area 41. The locked snubber 40 isolates the film frames in the film gate area 41 from the driving force of the drive system 14. The locked snubber also isolates the film in the gate area 41 from the inertial impact of the take-up spool system when the slack condition in the film, created by the incremental film advance, is reduced to zero. As explained in the above noted application of Arthur C. Mueller, Ser. No. 283,631, the film snubber spool 40 also is locked from rotation by a locking system provided in a camera to similarly isolate the film frames in the film gate area 41 from the camera take-up drive when the film frames are being exposed.

The snubber spool 40 incorporated within the cassette 20 is rotatably mounted on an axle 42. One end of the snubber spool 40 adjacent the axle 42 includes an annular friction braking surface 43 which is machined to frictionally engage against the adjacent interior surface of the wall of the cassette 20. The surface 43 is provided at the extreme diameter of the spool 40 and is adapted to frictionally engage with the wall of the cassette 20 to provide a substantial braking moment when the snubber 40 is locked. The opposite end of the snubber spool 40 includes a projecting locking portion 46, as clearly indicated in FIG. 5. The locking portion 46 projects through the wall of the cassette 20 and is externally accessible from the exterior of the cassette 20. Furthermore, as indicated in FIGS. 5 and 6, the locking portion 46 is provided with suitable recesses or detents, such as Y-shaped locking recess 48. In the illustrated embodiment, each of three portions of the recess 48 are uniformly spaced about the locking portion 46, 120° apart. The recess 48 is thereby adapted to be engaged by a locking mechanism which positively prevents the rotation of the snubber spool 40 within the cassette 20.

In accordance with this invention, the viewer 10 includes a snubber locking system 50 which operates to positively lock the snubber spool 40 in the cassette 20 without substantially displacing or disaligning the cassette with respect to the slot 12 in the viewer 10. In this regard, the viewer 10 is provided with a pair of scissor arms 51 and 52 which are pivotly mounted by means of a pivot screw 53. The forward end of the scissor members 51 and 52 are spaced to permit the cassette 20 to be received between the members, and the terminal ends define locking tips 54 and 55. The arms 51 and 52 are preferably identical in construction so that they may be manufactured from the same type of stamping operation and will be interchangeable parts. As illustrated in FIGS. 5 and 7, the locking tips 54 and 55 have a width which is selected to correspond to the radial length of the Y-shaped portions of the locking recess 48 provided on the snubber 40. Moreover, the thickness of the locking tips 54 and 55 is selected to be larger than the width of the portions of the locking recess 48 on the snubber 40. The ends of the locking tips 54 and 55 are beveled at 56 at an angle of approximately 15°, as seen in FIG. 7. Thus, the ends of the tips 54 and 55 are narrower than the width of the recess 48, and will fit snugly into the recess. Continued inward movement of the tips 54 and 55 will therefore wedge the tip 55 into the recess 48 and prevent any backlash movement of the snubber spool 40. The other tip 54 defined at the end of the arm 51 also may be provided with a bevel to make the arms 51 and 52 interchangeable. A bevel on the tip 54 is not essential, however, since the arm 51 engages with the flat outer wall of the cassette 20 during the actuation of the locking mechanism 50.

A tension spring 57 is extended between the forward ends of the scissor arms 51 and 52, as seen in FIG. 2, to constantly bias the arms inwardly toward each other and into a gripping relationship with respect to the cassette 20. The unit 10 also includes laterally extending abutment shoulders 58 and 59 which are positioned adjacent one end of the slot 12. As indicated in FIGS. 3 and 4, the abutment shoulders 58 and 59 are positioned to engage with the outer portions of the arms 51 and 52 and define the outer limit of movement of the scissor arms 51 and 52 when the locking mechanism 50 is in a released position, such as shown on FIG. 4.

The unit 10 also includes a frame member 60 which defines the support for the scissor arms 51 and 52. A projecting frame portion 61 of the frame 60 receives the pivot screw 53. The screw 53 is connected to the frame 61 in a manner which allows the arms to pivot freely around the screw 53 during the operation of the locking system 50. The frame portion 61 also includes a guide slot 62 which is aligned with the slot 12 provided in the unit 10. The activation of the scissor arms 51 and 52 is controlled by a cam-actuated cam arm follower and knee linkage arrangement connected to the outer ends of the arms 51 and 52. To accomplish this arrangement, as seen in FIG. 2, the outer ends of the arms 51 and 52 include knee links 70 and 71. One of the knee links 71 is provided with a shoulder 72. As indicated by FIGS. 3 and 4, the inward movement of the knee links 70 and 71, from an outer position shown in FIG. 3 to an inner position shown in FIG. 4, will activate the scissor arms 51 and 52 to move the tips 54 and 55 outwardly and thereby release the lock on the snubber 40. The spring member 57 urges the arm 51 and 52 and the knee links 70 and 71 into the locked position illustrated in FIG. 3.

The unit 10 in accordance with this invention also includes a rotatable cam shaft 80 which controls the sequential operation of the unit. The preferred system for controlling the sequence of operations of the cam shaft 80 and the locking system 50 is described and claimed in commonly assigned, co-pending application Ser. No. 374,284 filed June 28, 1973, for Film Handling Apparatus Control System, by Erwin Figge, et al, filed concurrently herewith.

As seen in FIG. 2, a snubber control cam 81 is provided on the shaft 80. The snubber cam 81 has a profile selected to control the sequential operation of the snubber locking system 50. The cam 81 is eccentric to the shaft 80, and includes an enlarged cam rise portion 82, and a cam dwell 83. A cam follower 84 is pivotably supported on a pivot point 85 provided on the frame 60 and includes a follower shoe 86 at its lower end. As illustrated in FIG. 2, the shoe 86 bears against the periphery of the cam 81. The upper end of the cam follower arm 84 is bifercated to form a pair of forks 87 and 88. The forward fork 87 is inserted within the guide slot 62, and engages with the slot to assure that the movement of the arm follower 84 does not displace the locking system 50 laterally with respect to the slot 12. The outer fork 88 is positioned for engagement with the shoulder 72 provided on the knee link 71.

As seen in FIGS. 2 and 3, when the cam dwell 83 is engaged with the shoe 86 of the follower arm 84, the forks 87 and 88 are positioned outwardly (to the left in FIG. 3) so that the spring 57 forcefully closes the scissor arms 51 and 52. In this condition, the locking tip 55 is biased into engagement with the locking recess 48 on the snubber 40 and the other tip 54 is biased against the wall of the cassette opposite to the snubber 40. As seen in FIG. 3, the forks 87 and 88 are spaced sufficiently to provide a gap between the outer fork 88 and knee joint shoulder 72 when the arms 51 and 52 are in their inward locked position. This gap prevents the fork 88 from interferring with the locking action of the spring 57.

The snubber 40 is thereby locked against rotation by the wedging of the beveled locking tip 55 into the recess 48 under the influence of the spring 57. The design and operation of the locking system 50 assures that the forces applied to the cassette 20 by the scissor arms 51 and 52 are substantially equal. Therefore, the operation of locking the snubber 40 from rotation does not substantially displace or disalign the cassette 20 from its selected position within the slot 12 of the unit 10.

When it is desired to release the snubber 40 for rotation, the shaft 80 is rotated to bring the cam rise segment 82 into engagement with the shoe 86. As indicated in FIGS. 2 and 4, the cam follower arm 84 is thereby depressed, and the arm pivots about the pivot point 85. The pivotable movement of the arm 84 moves the forks 87 and 88 inwardly with respect to the cassette 20, and urges the fork 88 against the shoulder 72. The form member 88 thereby collapses the knee links 70 and 71, and pivots the arm 51 and 52 outwardly from a locked position as illustrated in FIG. 3 to the released position illustrated in FIG. 4. The force of the cam 81 thereby overcomes the biasing force of the spring 57, and the tips of the scissor arms 51 and 52 are opened to thereby release the snubber 40 from its locked condition. Since the tips 54 and 55 are simultaneously released from the cassette 20, the releasing of the snubber lock in the above described manner likewise prevents any substantial displacement of the cassette 20 within the slot 12 as a result of the operation of the locking system 50.

Although the invention has been described with a certain degree of particularity, it should be understood that the present disclosure has been made only by way of example. Consequently, numerous changes in the details of construction are the combination and arrangement of components as well as the possible modes of utilization, will be apparent to those familiar with the art, and may be resorted to without departing from the spirit and scope of the invention as claimed.

What is claimed is:

1. A film snubber activation and control system for use with a film cassette having a rotatable and lockable film snubber, said system comprising:

means for stationing said cassette in a selected location with the film snubber in a selected position;

snubber locking means movable between a locked position engaged with said snubber in said selected position, to prevent rotation of said snubber, and a released position permitting rotation of said snubber, said snubber locking means being arranged to apply substantially equal and opposite forces to opposed portions of said cassette when said locking means moves into said locked position and being further arranged to release said opposite forces substantially similtaneously as said locking means is moved toward said released position; and activating means for selectively moving said snubber locking means between said locked and released positions;

whereby the activation of said locking means operates to lock and release said film snubber without substantial disalignment of said cassette from said selected location.

2. A film snubber system in accordance with claim 1 wherein said locking means comprises a pair of separable locking arms, at least one of which is aligned with said film snubber in said selected position, and further wherein said activating means operates said locking arms to engage said one arm with said snubber and to apply a substantially equal and opposite force to a portion of said cassette opposite from said snubber through the other locking arm, so that said snubber is locked from rotation without substantial disalignment of said cassette from said selected position.

3. A film snubber system in accordance with claim 2 wherein said activating means operates said locking arms to release said arms from said snubber and cassette portion substantially simultaneously, so that release of said snubber creates no substantial disalignment of cassette from said selected position.

4. A film snubber system in accordance with claim 2 wherein said snubber is provided with a detent engageable with said one locking arm to prevent the rotation of said snubber.

5. The invention in accordance with claim 4 wherein said snubber detent comprises a recess of selected dimensions and wherein the end of said one locking arm engageable with said snubber includes a projection dimensioned to be received within said snubber recess.

6. The invention in accordance with claim 5 wherein said projection on said one arm is bevelled to firmly wedge within said snubber recess as said one arm is moved into said locked position by said activating means.

7. A film snubber system in accordance with claim 2 wherein said locking arms comprise a pair of scissor arms joined at a pivot point and defining separable cassette-engaging ends, and further wherein said system includes biasing means urging said cassette-engaging ends toward said locked position.

8. The invention in accordance with claim 7 wherein said pivot point is intermediate the ends of said arms and further wherein the other ends of said arms include means engageable with said activating means to move said cassette-engaging ends of said arms between said locked and released positions.

9. The invention in accordance with claim 8 wherein said other ends of said scissor arms are connected by a knee linkage which is engageable by said activating means to pivot said arms about said pivot point and move said cassette-engaging ends thereof toward said released position against the force of said biasing means.

10. The invention in accordance with claim 9 wherein said activating means comprises a rotatable cam having a selected cam profile and a cam follower means engageable with said cam profile and said knee linkage to selectively operate said arms in response to the rotation of said cam.

11. The invention in accordance with claim 10 wherein said cam follower means is spaced from said knee linkage with said scissor arms in said locked position so that said biasing means is free to urge said arms toward said locked position without interference from said cam follower means.

* * * * *